(12) United States Patent
Harnay

(10) Patent No.: US 9,078,265 B2
(45) Date of Patent: Jul. 7, 2015

(54) OPTIMIZING BLOCK RECEPTION FOR SIMULTANEOUS USE OF AT LEAST TWO SIM CARDS

(75) Inventor: Didier Harnay, Cesson Sevigne (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 196 days.

(21) Appl. No.: 13/574,387

(22) PCT Filed: Jan. 27, 2011

(86) PCT No.: PCT/EP2011/051159
§ 371 (c)(1),
(2), (4) Date: Oct. 2, 2012

(87) PCT Pub. No.: WO2011/092254
PCT Pub. Date: Aug. 4, 2011

(65) Prior Publication Data
US 2013/0203426 A1    Aug. 8, 2013

Related U.S. Application Data

(60) Provisional application No. 61/379,847, filed on Sep. 3, 2010.

(30) Foreign Application Priority Data

Jan. 28, 2010 (EP) .................................. 10305098
Jul. 16, 2010 (EP) .................................. 10305790

(51) Int. Cl.
*H04W 72/00* (2009.01)
*H04W 72/04* (2009.01)
*H04W 76/02* (2009.01)
*H04W 88/06* (2009.01)

(52) U.S. Cl.
CPC .......... *H04W 72/048* (2013.01); *H04W 76/026* (2013.01); *H04W 88/06* (2013.01)

(58) Field of Classification Search
USPC ........................................................ 455/450
See application file for complete search history.

(56) References Cited

U.S. PATENT DOCUMENTS

| 2003/0125073 A1* | 7/2003 | Tsai et al. ............... 455/552 |
| 2009/0131054 A1 | 5/2009 | Zhang |
| 2009/0156257 A1 | 6/2009 | Shi |
| 2009/0191919 A1* | 7/2009 | Kawamura ............ 455/558 |
| 2009/0312020 A1 | 12/2009 | Lee |

OTHER PUBLICATIONS

International Search Report issued in corresponding International application No. PCT/EP2011/051159, mailing date Jun. 6, 2011.
Extended European Search Report issued in corresponding European application No. 10305790.7, completion date May 27, 2011.
Written Opinion of the International Searching Authority issued in corresponding International application No. PCT/EP2011/051159, mailing date Jun. 6, 2011.

* cited by examiner

*Primary Examiner* — Joel Ajayi
(74) *Attorney, Agent, or Firm* — Patent Portfolio Builders PLLC

(57) ABSTRACT

There is described a method for optimizing block reception for products that do support a simultaneous use of at least two SIM cards.

15 Claims, 3 Drawing Sheets

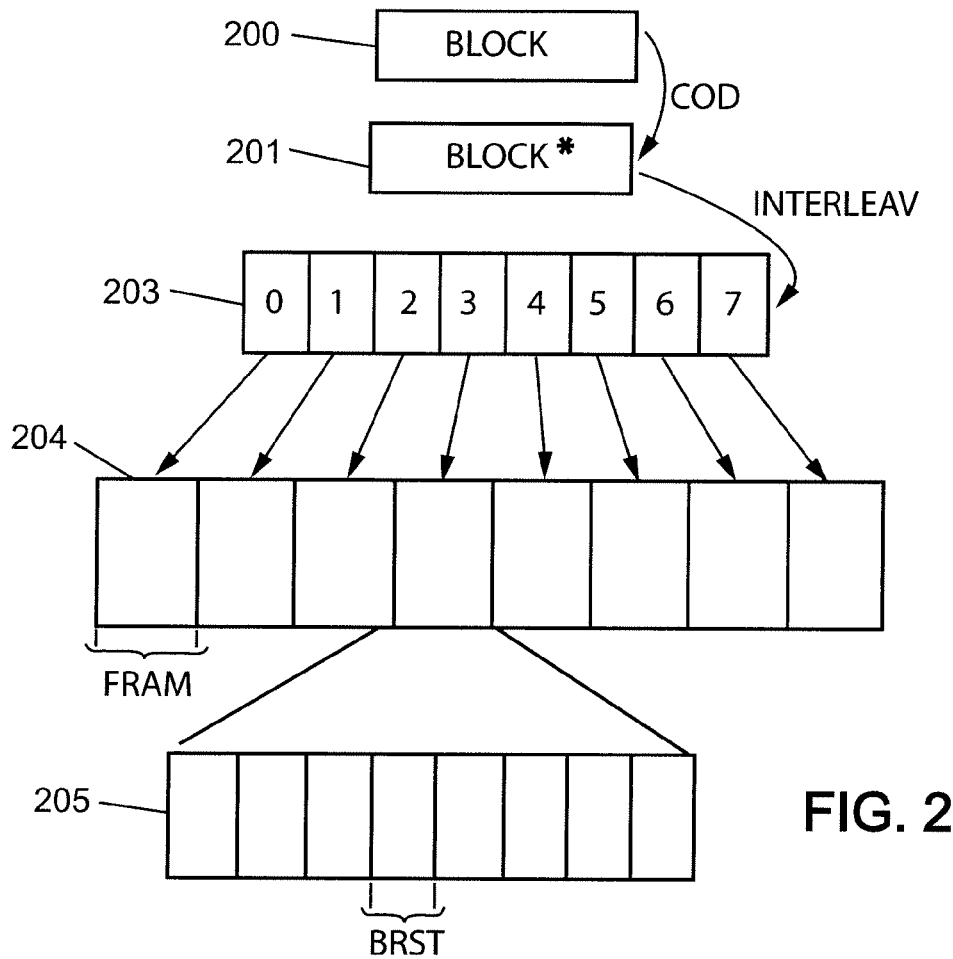
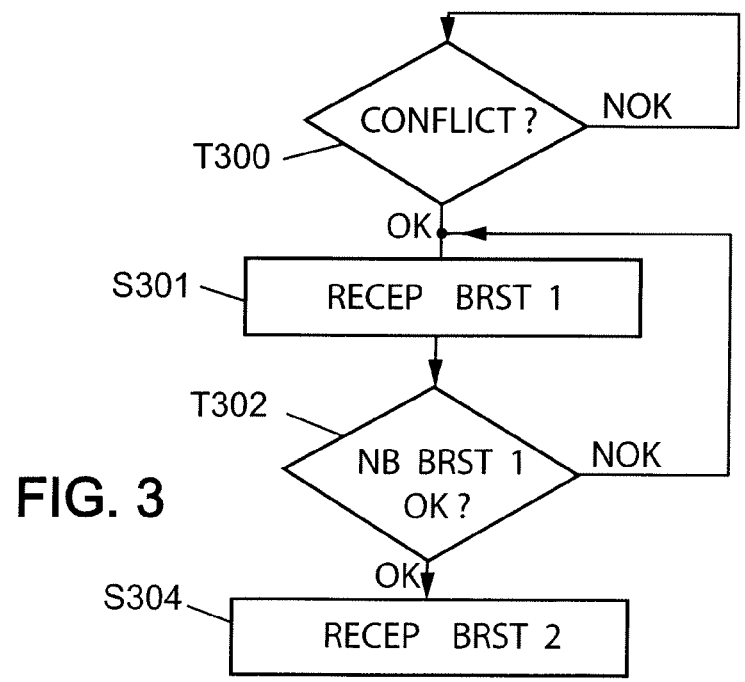

OPTIMIZING BLOCK RECEPTION FOR SIMULTANEOUS USE OF AT LEAST TWO SIM CARDS

TECHNICAL FIELD

The present invention generally relates to wireless devices, and more specifically to devices and methods for optimizing block reception of devices that support the use of several SIM cards.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments of the invention need not solve all (or even any) of the problems brought forward in this section.

In 3GPP GSM/CPRS/EDGE wireless devices, handling of Dual Standby mode (also known as DSDS, standing for "Dual SIM Dual Standby"). With a single RF receiver and/or a single baseband processor may experience some limitations in a situation with timing conflicts between RF activities relative to each SIM. Such conflicts may result in missing blocks related to either one SIM or the other (or both in a worst case situation). Examples of blocks that may be missed include BCCH blocks for system information and/or PCH blocks for paging. Losing these blocks lead to degraded performances (increased incoming call miss rate). Other examples of blocks that may be missed include data blocks coding speech signals.

Two possible ways to handle this situation in relation to DSDS are:

Use of two RF receivers and two baseband processors. Thus, each RF receiver and each baseband processor can serve a respective one of the SIM cards. This solution has the drawback of increasing the cost associated with the dual SIM device.

Use of a single RF receiver and a single baseband processor, and handling conflicts in software. For example, in case of conflicts between blocks related to each of the SIM cards, layer 1 software (L1) may select which block will be received and decoded. A Round Robin scheme can be applied in an attempt to limit the degradation by making the selection substantially random. However, all cases of conflicts cannot be fully solved in this approach. Thus, the performance related to each SIM card will be degraded compared to single SIM card operation. Hence, this solution suffers the drawback of not being able to achieve 100% call rate in some configurations (when conflict on paging occurs and a same DRX scheme is used for both SIMs, for example). Also, when data blocks representing speech signals are missed, this solution may not provide a satisfying quality of communication.

SUMMARY

Therefore, a first aspect of the invention relates to a method of controlling access to resources for processing data transmitted through at least one telecommunications network by management means of at least two SIM cards, of a mobile telecommunications device supporting a simultaneous use of the at least two SIM cards, whereby embodiments of the invention aim at alleviating at least some of the above problems.

According to the first aspect, there is provided a method of controlling access to resources for processing data transmitted through at least one telecommunications network by management means of at least two Subscriber Identity Module, SIM, cards, in a mobile telecommunications device supporting a simultaneous use of the at least two SIM cards, wherein the data transmitted through said at least one telecommunications network are transmitted as groups of a number N of burst data packets, the burst data packets enabling the terminal to decode data blocks, the method comprising:

a first step of controlling processing through the resources of a number P of first burst packets of data of a first block of data to be received for a first SIM card of the mobile telecommunications device, with P being inferior or equal to N, and when said number P of first burst packets of data is received:
a second step of controlling processing through the resources of second burst packets of data of a second block of data to be received for a second SIM card of the mobile telecommunications device.

Embodiments of the invention are recited in the dependent claims attached hereto.

For example, the burst packets of data facilitate the decoding of data blocks by the terminal. Some of these burst packets of data may be ignored without preventing the data blocks from being decoded.

For example, the first burst packets of data are successive burst packets of data. Hence, it may be switched to the reception for the second SIM card when the number of burst packets of data received is enough for decoding a data block.

The number P may be strictly inferior to the number N. Hence, a rapid switch to the reception for the second SIM card may be performed.

Embodiments of the invention rely on a mechanism that allows reception of blocks using a reduced number of bursts and make dynamic transitions between blocks related to different SIMs to maximize the success of block reception for both SIMs. Thus, depending on RF conditions and/or on priorities, the collection of bursts of each block is split into processed bursts and non-processed bursts. For example, when there are four bursts in each block and when there is complete overlap in time, if one burst is enough for detecting that a paging block related to the first SIM is empty, three bursts may be available for blocks related to the second SIM. The detection of an empty paging block may be performed by comparing the first burst packet of data of the paging block to the first burst packet of data of an empty block previously received.

In the process of deciding to skip to reception of data for another SIM card, other embodiments may rely on:

the detection of empty transmissions such as empty paging, for the current SIM card, and/or the early or partial decoding of data block for the current SIM card without waiting for the total number of bursts of data to be transmitted, and/or the detection of bad reception conditions for the current SIM card.

In some embodiments, focus is on the dynamic aspects. In case of conflict, priority may be given to one SIM card when starting the reception of a first burst. Depending on the detection/decoding result of the block of this SIM card, a switch may be performed as soon as possible to reception of a block related to the second SIM card.

A third aspect of the present invention relates to a computer program product comprising one or more stored sequences of instructions that are accessible to a processor and which, when executed by the processor, cause the processor to carry out the steps of the method of the first aspect of the present invention.

A fourth aspect of the present invention relates to a User Equipment comprising a device according to the second aspect.

A fifth aspect of the present invention relates to a communication system comprising a plurality of cells and at least one User Equipment according to the fourth aspect.

A sixth aspect of the present invention relates to a circuit configured for implementing the method according to the first aspect.

BRIEF DESCRIPTION OF THE DRAWINGS

The present invention is illustrated by way of example, and not by way of limitation, in the figures of the accompanying drawings, in which like reference numerals refer to similar elements and in which:

FIG. 2 is a schematic illustration of the coding of a speech signal;

FIG. 3 is a flowchart illustrating steps of a method according to embodiments of the invention.

DESCRIPTION OF PREFERRED
EMBODIMENTS

Figure 1:
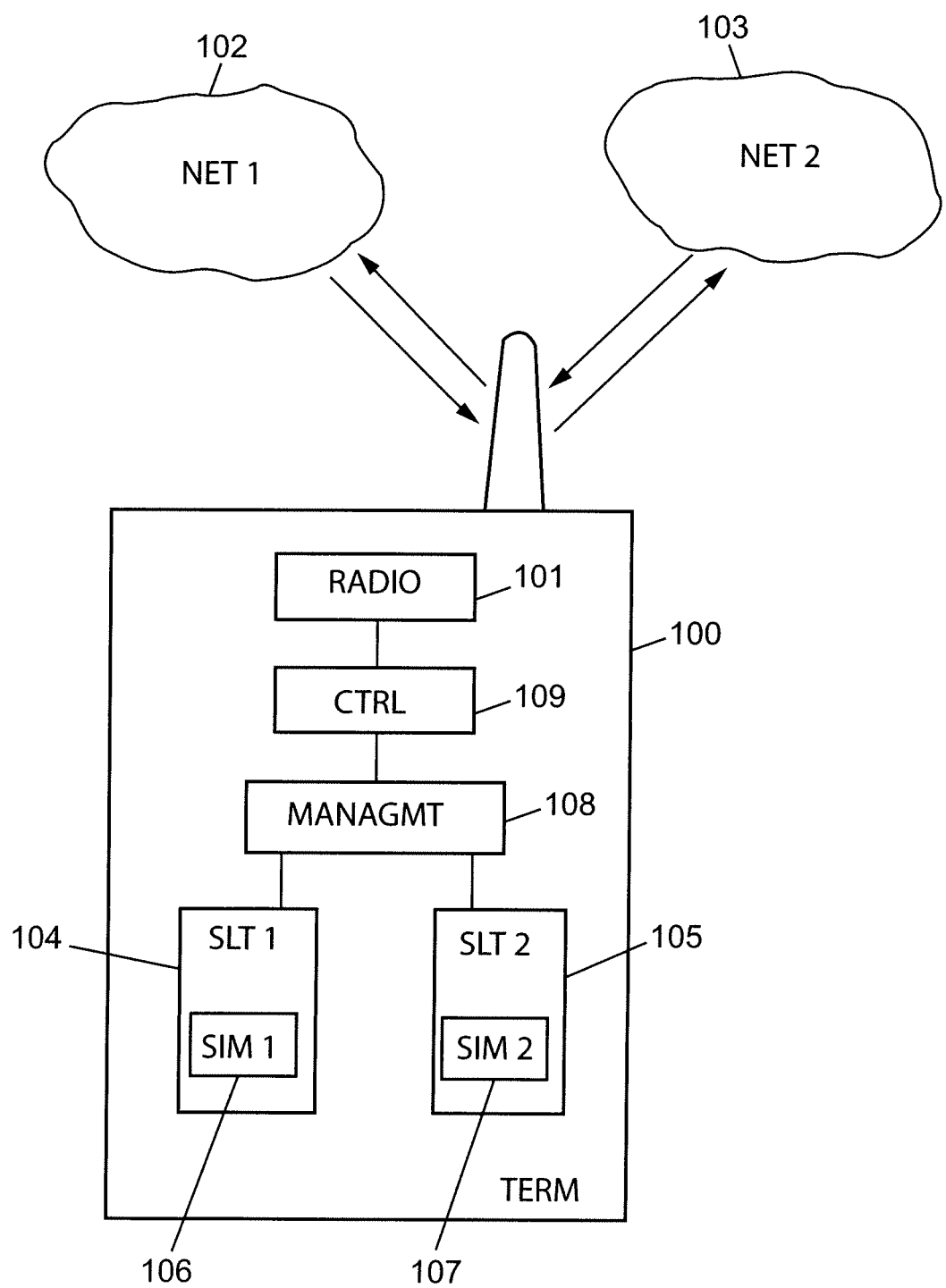
FIG. 1 is a schematic illustration of a device according to embodiments of the present invention.

FIG. 1 shows a mobile telecommunications device 100 comprising radio means 101 (such as an RF receiver) for performing radio telecommunications through one or more radio telecommunications networks 102, 103. Device 100 supports a Dual Standby mode (DSDS) which enables performing communications simultaneously over several networks. Device 100 comprises two or more SIM (Subscriber Identity Module) card slots 104, 105, for installing SIM cards 106, 107. For example, SIM card 106 is associated to network 102, and the communications performed over network 102 are performed using SIM card 106. For example, SIM card 107 is associated to network 103, and the communications performed over network 103 are performed using SIM card 107. Device 100 comprises a management unit 108 (such as a baseband processor) for managing the SIM cards and the communications associated to each card. In order to perform a communication (receiving or transmitting data), the management unit has to access the radio means of the device. In order to manage the access to the radio means for each SIM card, there is provided a control unit 109. Control unit 109 notably gives access to the radio means to each SIM card according to the method discussed hereafter.

With reference to FIG. 2, in the 3GPP GSM/CPRS/EDGE domain, speech signals are divided into 20 ms frames. The speech signal frames are then coded into data blocks 200 of 260 bits. The data blocks are then channel coded into coded data blocks 201 of 456 bits. The channel coded data blocks are then interleaved by sub-blocks 203 of 57 bits. The sub-bocks are then distributed in time slots of TDMA frames 204 (Time Division Multiple Access). One time slot constituting a burst packet of data 205 (or bursts in the following).

According to the prior art, in order to reconstitute a data block representing a speech signal frame, the terminal receives and processes N (in a typical scenario N=4) burst data packets. However, the coding of speech signal frames introduces redundancy and according to the method discussed hereafter, this redundancy of data will be taken advantage of. Also, data are broadcasted by series of N burst packets of data, and in some cases, the data to be transmitted to the terminal is contained in a single burst (for example for the broadcasting of management data such as paging data). It will also be taken advantage of this case of "empty bursts".

Terminal 100, as it supports a Dual Standby mode, may receive burst packets of data for communications associated to each SIM card. For each SIM card, the control unit 109 will have to grant access to the management unit 108 for receiving the burst packets of data. Then, once the management unit has been granted access to the radio resource for a given SIM card, data can be received for this given SIM card.

Conflicts may appear when each SIM card needs to receive a burst data packet at a same time.

Another example is given with reference to the control signals that are transmitted in CCCH (Common Control Channel) blocks. CCCH blocks have 184 bits of data and 40 bits of CRC (Cyclic Redundancy Check). The encoding of the CCCH blocks which introduces redundancy, leads to a total of 456 bits. Each CCCH block is transmitted as 4 bursts packets of data, each having 114 bits.

The CCCH blocks are transmitted during the IDLE mode to which the DSDS applies.

FIG. 3 is a flowchart illustrating the steps of the method for managing the access to the radio resources 101.

When a conflict in the reception of burst packets of data is detected in step T300, reception of burst packets of data is performed for a selected SIM card in step S301. The conflict may be detected according to any existing or future method as will be apparent to the person with ordinary skill in the art. In the handling of a communication, it may be possible to predict the reception of a burst packet of data. The SIM card selected may be the main SIM card of the terminal, or the SIM card performing a communication considered as important. Then, a person with ordinary skill in the art may select the SIM card according to other selection criteria, depending on the priority associated to each SIM card or to each communication performed by each SIM card.

According to embodiments of the present invention, advantage may be taken of the fact that data are broadcasted with redundancy. Indeed, the terminal may not need all the four burst packets of data for decoding the data block associated to these burst packets of data.

For example, under good conditions of transmission of data, the data of a block of data may not be corrupted so that the redundant data that is provided for recovering the data block in case of data corruption are not necessary for decoding the data block.

In a further example, a data block may correspond to an empty transmission. In such an example, the data block does not contain information to be processed. Then, it may be decided not to process the burst packets of data associated to such a data block.

In another example, reception conditions may be so bad that is not worth trying to decode the data block because the probability of success of decoding is very low. In such conditions, after having detected that the reception conditions are not good enough to ensure good decoding of the data block, it may be decided not to receive the data block.

When it is decided in step T302 that no further packets are needed (after a number P of burst packets of data is received), or that reception conditions are not good enough, or that the data block is empty, access to the radio means is given to the management unit 108 for receiving burst packets of data for the other SIM card in step S304.

The number of received burst packets of data may be determined according to several embodiments.

For example, it may be determined in step T302 whether the number of received burst packets of data is sufficient for decoding the associated block of data. This number of burst packets of data may be determined according to the reception conditions. Thus, as soon as the data block is decoded, the terminal stops receiving further burst packets of data for the selected SIM card and switches to the reception of burst packets of data for the other SIM card.

In another embodiment, when a predetermined number of received burst packets of data is reached, the terminal switches to the reception of burst packets of data for the other SIM card. For example, the predetermined number is a number according to which the data block associated to the received burst packets of data is likely to be decoded under current reception conditions. If the data block cannot be decoded with the received burst packets of data, the terminal will get back to the reception of the burst packets of data for the selected SIM card after step S304. The predetermined number may also correspond to a sharing of the radio means between the SIM cards. Namely, when the radio resource have been used a given amount of time, or for receiving a given quantity of data by the selected SIM card, access is given to the radio resources to the other SIM card.

In another embodiment, it is switched to the reception of burst packets of data for the other SIM card when the conflicting burst packets of data for this other SIM card are associated to a communication which has a priority level greater than another priority level of the communication taking place with the selected SIM card The diagrams of FIGS. 4-7 illustrate the switch from a first SIM card to a second SIM card for conflicts on 3 or 4 bursts, between a radio block of the first SIM card (SIM1) and a block of the second SIM card (SIM2). The same principle can be extended to conflicts on 1 or 2 bursts only.

In the figures, the bursts of each of the blocks are represented from left to right in their order of receipt in time. The bursts of the block on SIM1 are represented above the horizontal line L representing time, and the bursts of the block of SIM2 are represented under said horizontal line. Bursts which are not received by the RF receiver of the terminal nor decoded by the Baseband processor of the terminal are marked with a cross.

Figure 4:
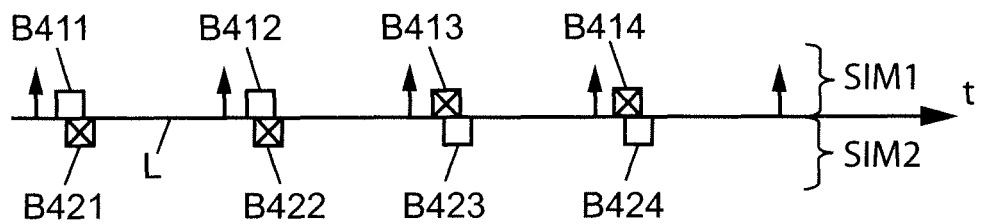
FIGS. 4-7 are diagrams which illustrate the proposed method in examples with conflicts on 3 or 4 bursts.

In the example of FIG. 4, the access to the RF receiver of the radio means is firstly given to the management unit for the communication for SIM1. A block of data on SIM1 is decoded correctly after receipt of two bursts B411 and B412, allowing receiving two bursts B423 and B424 on SIM2 which may be enough in most of RF conditions to decode correctly a data block. As illustrated in this example, when bursts B411, B412, B423, and B424 are received, the respectively conflicting bursts B421, B422, B413, and B414 are not received.

Figure 5:
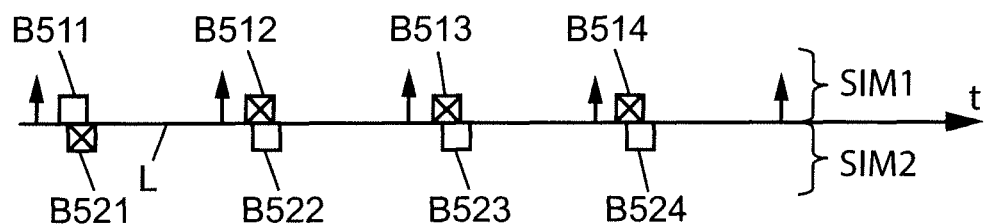

In the example of FIG. 5, a paging block on SIM1 is detected to be empty after the first burst B511, allowing receiving three bursts B522, B523, and B524 on SIM2 which may be enough in most of RF conditions to get a good block reception and decoding.

Figure 6:
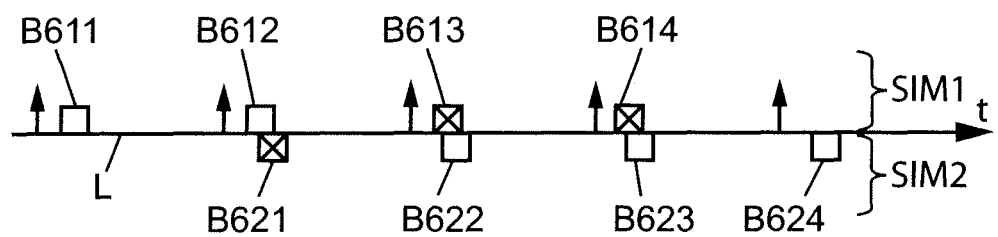

In the example of FIG. 6, there is a conflict for three bursts of each radio block. A block of data on SIM1 is decoded correctly after two bursts B611 and B612, allowing receiving three bursts B622, B623 and B624 on SIM2 which may be enough in most of RF conditions to get a good block reception and decoding.

Figure 7:
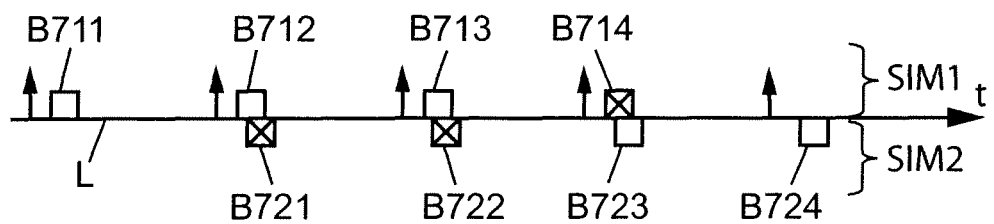

Finally, in the example of FIG. 7, there is a conflict for three bursts of each radio block. Block on SIM1 is decoded correctly after three bursts B711, B712, and B713, allowing receiving two bursts B723 and B724 on SIM2, which may be enough in most of RF conditions to get a good block reception and decoding.

Some advantages of some embodiments of the invention are as follows.

Under acceptable RF conditions (that is to say, for instance, below the reference sensitivity level defined in 3GPP specifications), the mechanism allows for reception of all blocks from both SIM cards. Then a 100% incoming call rate can be achieved. One component used to achieve this is the dynamic behavior of the control system in some embodiments of the invention.

According to some embodiments, adaptive algorithms can be applied to prioritize (and/or force transition) from one block to another. This functionality may depend on the RF conditions. The priority of actions may be considered from L1 point of view.

Embodiments of the present invention can be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after a conversion to another language. Such a computer program can be designed based on the flowchart of FIG. 3 and the present description. The computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed may be combined without departing from the scope of the invention.

The invention claimed is:

1. A method comprising:
controlling access to resources for processing data transmitted through at least one telecommunications network by management means of at least two Subscriber Identity Module, SIM, cards, of a mobile telecommunications device supporting a simultaneous use of the at least two SIM cards, wherein the data broadcasted through said at least one telecommunications network are broadcasted as groups of a number N of burst packets of data by,
a first step of controlling processing through the resources of a number P of first burst packets of data of a first block of data to be received for a first SIM card of the mobile telecommunications device, with P being less than N, stopping receiving further burst packets of data for the first SIM card and switching to reception for a second SIM card when said number P of first burst packets of data is received without waiting for said number N of burst packets of data to be transmitted, and
a second step of controlling processing through the resources of one or more second burst packets of data of a second block of data to be received for the second SIM card of the mobile telecommunications device,
wherein the first and second steps of controlling are performed in case of a conflict in reception of the first burst packets of data and reception of the second burst packets of data.

2. The method according to claim 1, wherein the resources comprise radio resources.

3. The according to claim 1, wherein the processing of data comprises at least one of the processing of at least one control signal, and the processing of at least one empty message.

4. The method according to claim 1, wherein the mobile telecommunications device supports a dual standby mode.

5. The method according to claim 1, wherein the number P of first burst packets of data corresponds to a number of burst packets of data sufficient for decoding the first block of data, under current conditions of data reception.

6. The method according to claim 2, wherein the number P of first burst packets of data corresponds to a threshold of use of the radio resources for the first SIM card.

7. The method according to claim 1, wherein the number P of first burst packets of data is set according to a first priority criteria associated to the data to be received for the first and the second SIM card.

8. The method according to claim 1, wherein the number P of first burst packets of data is set according to a second priority criteria associated to the first and the second SIM card.

9. The method according to claim 1, wherein the number P depends on whether the first block is empty or not.

10. The method according to claim 1, further comprising prior to the first and second steps of controlling:
a step of detecting the conflict in the reception of the first burst packets of data and the reception of the second burst packet of data.

11. A computer program product comprising instructions for implementing the steps of a method according to claim 1 when loaded and run on computer means of a mobile telecommunications device.

12. A circuit comprising:
a controller configured to control access to resources for processing data transmitted through at least one telecommunications network by management means of at least two Subscriber Identity Module, SIM, cards, in a mobile telecommunications device supporting a simultaneous use of the at least two SIM cards, wherein the data transmitted through said at least one telecommunications network are transmitted as groups of a number N of burst packets of data by:
controlling the processing through the resources of a number P of first burst packets of data of a first block of data to be received for a first SIM card of the mobile telecommunications device, with P being less than N, stopping receiving further burst packets of data for the first SIM card and switching to reception for a second SIM card when said number P of first burst packets of data is received without waiting for said number N of burst packets of data to be transmitted, and
controlling the processing through the radio resources of one or more second burst packets of data of a second block of data to be received for the second SIM card of the mobile telecommunications device,
wherein the first and second steps of controlling are performed in case of a conflict in reception of the first burst packets of data and reception of the second burst packets of data.

13. The circuit according to claim 12, being further configured to detect a conflict in the reception of the first burst packets of data and the reception of the second burst packet of data, prior to the control of the processing of the first and second burst packets of data.

14. The circuit according to claim 12 wherein the number of first burst packets of data corresponds to at least one of:
a number of burst packets of data sufficient for decoding the first block of data, under current conditions of data reception,
a threshold of use of the radio resources for the first SIM card,
a number set according to a first priority criteria associated to the data to be received for the first and the second SIM card,
a number set according to a second priority criteria associated to the first and the second SIM card, and
a number which depends on whether the first block is empty or not.

15. A mobile communication device comprising:
resources for processing data transmitted through at least one telecommunications network, wherein the data transmitted through said at least one telecommunications network are transmitted as groups of a number N of burst data packets, the burst data packets enabling the terminal to decode data blocks,
a first Subscriber Identity Module, SIM, card slot,
a second SIM card slot,
management means for SIM cards, and
a control unit for managing access to the resources by the management means of the SIM cards, the control unit comprising a circuit according to claim 12.

* * * * *